Figure 1:
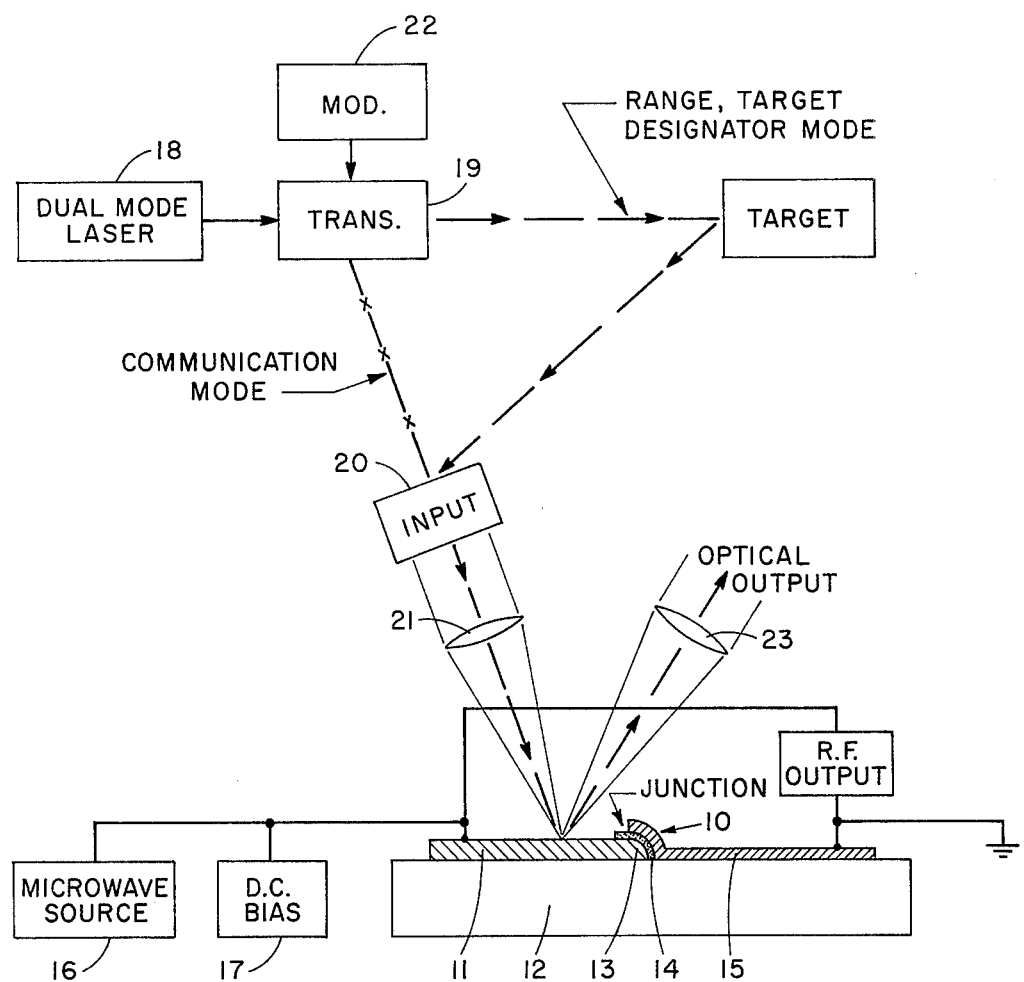

United States Patent [19]

White

[11] 4,093,380

[45] June 6, 1978

[54] OPTICAL SYSTEMS UTILIZING THREE-WAVE HETERODYNE DETECTORS

[75] Inventor: Matthew B. White, Cohasset, Mass.

[73] Assignee: The United States of America as represented by the Secretary of the Navy, Washington, D.C.

[21] Appl. No.: 738,989

[22] Filed: Nov. 4, 1976

[51] Int. Cl.² .............................................. G01C 3/08
[52] U.S. Cl. ...................................... 356/5; 250/211 J
[58] Field of Search ................... 356/5, 28; 332/7.51; 250/211 J, 199; 324/79 R

[56] References Cited

U.S. PATENT DOCUMENTS

| | | | |
|---|---|---|---|
| 3,508,828 | 4/1970 | Froome et al. | 356/5 |
| 3,825,341 | 7/1974 | Goto | 356/28 |
| 3,864,041 | 2/1975 | Long | 356/28 |
| 3,898,453 | 8/1975 | Javan | 250/211 J |
| 3,984,675 | 10/1976 | Corcoran et al. | 332/7.51 |

*Primary Examiner*—S. C. Buczinski
*Attorney, Agent, or Firm*—R. S. Sciascia; L. I. Shrago

[57] ABSTRACT

Systems which utilize an optical signal to carry information and employ a three-wave heterodyne detector of the type having a cubic response do not require a local optical signal source in the receiving apparatus since the optical signal as generated provides two optical signal components for the detector's operation. The third signal is supplied by a local microwave oscillator. A high resolution optical wave ranging system having an improved field-of-view is disclosed which uses such a composite signal in conjunction with a pair of three-wave heterodyne detectors.

5 Claims, 2 Drawing Figures

OPTICAL SYSTEMS UTILIZING THREE-WAVE HETERODYNE DETECTORS

The present invention relates generally to transmission and receiving systems utilizing optical radiation and employing a heterodyne signal detecting process.

Conventional heterodyne detectors of optical radiation normally exhibit a quadratic response with the output voltage $V_o$ equaling $K\,E^2$, where E is the electric field amplitude of the signal at the detecting surface, and K is a constant. If a weak optical signal and a strong local oscillator signal are simultaneously incident on such a detector, the output signal developed contains a component at the difference frequency which is proportional to the product of the amplitude of the two signals. This performance may be contrasted with the operation of the detector in the envelope mode of detection where the output voltage produced is proportional to the square of the amplitude of the weak optical signal. Thus, the heterodyne arrangement exhibits a so-called conversion gain, $g$, which equals $E_{lo}/E_s$ where $E_{lo}$ is the amplitude of the comparatively strong local oscillator signal and $E_s$ that of the weak input optical signal. The primary disadvantages of the heterodyne detection process in optical communication systems are (1) it requires a strong, stable local oscillator source of optical radiation whose frequency must be off-set from that of the input signal, and (2) the field-of-view of the system embodying it is restricted to $\theta_{view} \approx 2.4\,\lambda/D$ where $D$ is the diameter of the detector itself or the receiving optics of the system in which it forms a part, and $\lambda$ is the optical wavelength.

There has recently been developed a new type of optical detector that can be utilized in the heterodyne process which has a cubic response with the output voltage $V_o$ being equal to $K\,E^3$. Three signals instead of the usual two are involved in the operation of this detector. The structural details of the detector are disclosed in U.S. Pat. No. 3,898,453 which issued Aug. 5, 1975.

In such a detector is exposed simultaneously to two optical sources of radiation such as $E_1 \cos \omega_1 t$ and $E_2 \cos \omega_2 t$, and a microwave signal of the form $E_{mw} \cos \omega_{mw} t$ is coupled thereto, the output will have a component given by $$V_o = K\,E_1 E_2 E_{mw} \cos\left[(\omega_{mw} - \omega_2 + \omega_1)t\right] \qquad (1)$$

Its frequency will equal $\omega_{mw} - \Delta\omega_{opt}$ where $\Delta\omega_{opt}$ equals $\omega_2 - \omega_1$, and its amplitude will be determined by the product of the three signals involved in the heterodyning process.

It is noteworthy in connection with the operation of this cubic response detector that even if the $\Delta\omega_{opt}$ lies in the microwave region, the frequency of the output signal $\omega_o$, which equals $\omega_{mw} - \Delta\omega_{opt}$, can be conveniently shifted to the low radio frequency region by a proper selection of $\omega_{mw}$. Likewise, conversion gain can be realized by resorting to a large microwave signal amplitude even if both optical signal amplitudes are small.

One important advantage of this so-called "three-wave" heterodyne detection process is that the field-of-view is determined by $\lambda_{mw}/D$, where $\lambda_{mw} = 2\pi/\omega_{mw}$, rather than $\lambda/D$. Thus, for example, with a 10 GHz microwave difference frequency between the optical signals and $\omega_{mw} \approx \omega_{opt}$, a field-of-view of 0.5 rad may be achieved with a 10 cm receiving aperture diameter.

This large field-of-view capability is extremely desirable for military applications such as optical radars and imaging devices.

One of the disadvantages of using both two-wave and three-wave heterodyne detectors has been the previous requirement that the receiver have available a highly stabilized, comparatively strong optical local oscillator signal. Such a signal must be provided by a laser, and the need for this apparatus limits the military applications where these detectors can be usefully employed.

It is, accordingly, an object of the present invention to provide a receiving arrangement for optical radiation which employs a three-wave heterodyne detection process wherein two optical frequencies are supplied by the input signal.

Another object of the present invention is to provide a method of operating a three-wave optical heterodyne detector wherein two optical frequencies are provided by an input signal, and a third microwave frequency signal is provided by a locally generated microwave oscillator.

Another object of the present invention is to provide a receiver arrangement for optical radiation where the heterodyne detector, which has a cubic response, does not require a local source of optical radiation.

Another object of the present invention is to provide a high-resolution optical phase ranging system utilizing a three-wave heterodyne detection process.

Another object of the present invention is to provide an optical phase ranging system having an expanded field-of-view which is determined by the wavelength of a microwave signal source coupled to a three-wave heterodyne detector utilized in the receiving portion of the system.

Figure 2:
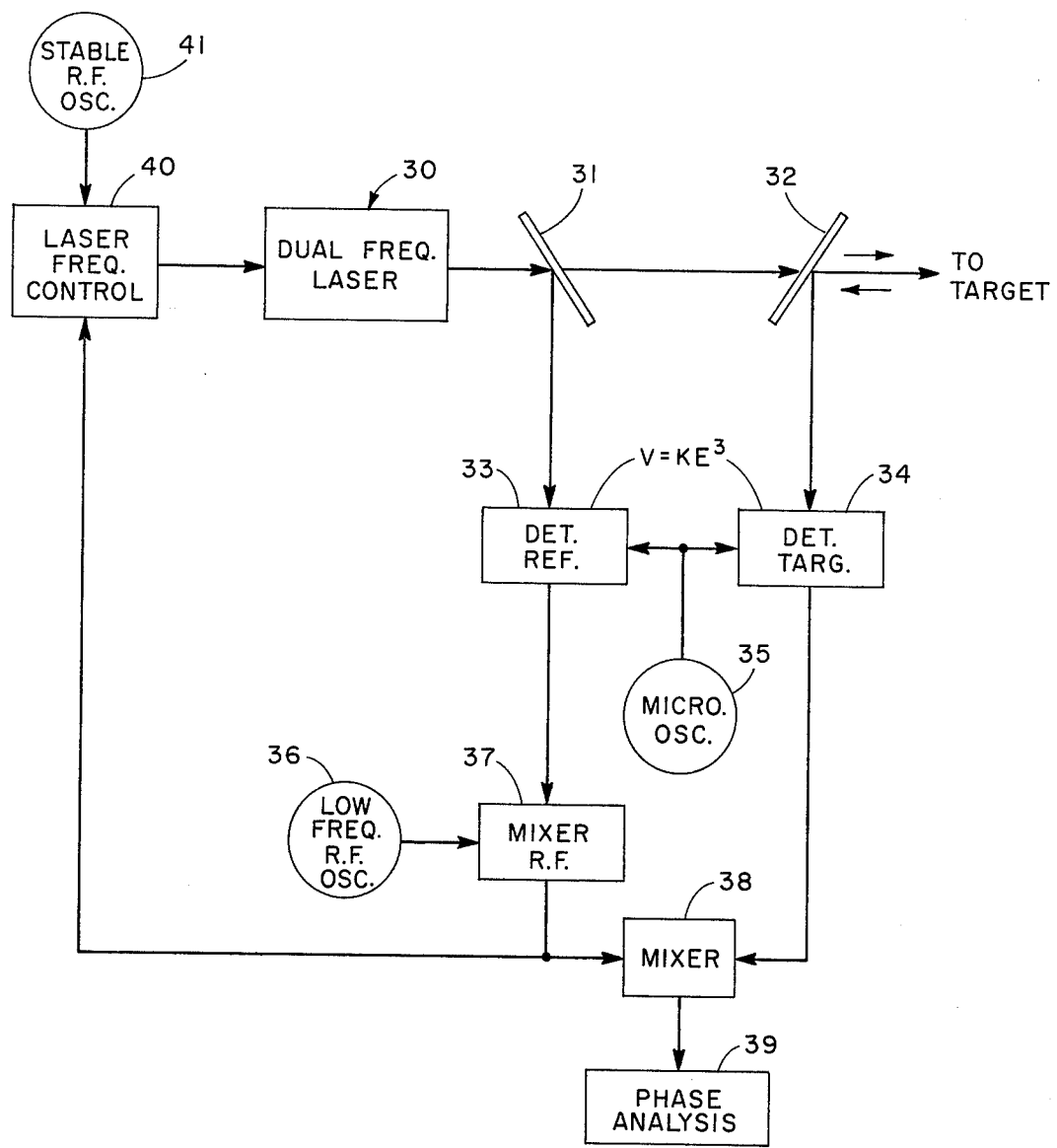

Other objects, advantages and novel features of the invention will become apparent from the following detailed description of the invention when considered in conjunction with the accompanying drawings wherein:

FIG. 1 schematically illustrates the operating principle of the present invention as applied to an optical communication system; and FIG. 2 is a schematic diagram of an optical phase ranging system embodying the invention.

Briefly, and in somewhat general terms, the objects of invention enumerated above are realized by utilizing the optical detector mentioned above, which has a cubic response, in the receiving apparatus and employing in the transmission portion of the particular system involved, a composite signal which consists of two optical signals that are closely spaced and are co-collimated. These signals may be conveniently derived from a dual mode laser, for example. The presence of the two optical components provides the basis for a coded transmission system which is an additional advantage in military applications such as secure communication systems and target designators.

The mean optics signal frequency can be readily varied by appropriate intercavity adjustments which change the frequency of both laser output signal components but not their frequency separation.

Even though both optical signal components may be comparatively weak because of transmission conditions and other losses associated with the optical configuration of the particular system involved, conversion gain can still be realized by means of the microwave signal source, which is coupled directly to the detector and whose power level may be made sufficiently high to raise the product of the amplitudes of the three signals participating in the heterodyne process to the magnitude desired.

The employment of the direct three-wave heterodyne detection process also permits the processing of optical signals with large, ie. 10 to 100 GHz, frequency separations without the necessity of resorting to high frequency apparatus. This is due to the fact that the output signal leaving the detector, $\omega_{mw} - \Delta\omega_{opt}$, may be at a comparatively low IF frequency. Thus, for example, a very high resolution phase ranging system may be constructed using a comparatively inexpensive radio frequency receiver rather than microwave frequency circuits and components.

Referring now to FIG. 1 of the drawings which illustrates how the present invention may be utilized in, for example, either a communication, range measuring or target designating system, it will be seen that the optical detector used in the receiving apparatus consists of a diode 10 formed by a first thin film conductive strip 11, designated the antenna leg, which is deposited on a substrate 12. The end portion 13 of this strip is fashioned into a point, and a portion of the tip is oxidized so as to have a dielectric layer 14 of a few angstrom thickness formed thereon. A second thin metallic strip 15 is also deposited on substrate 12 in alignment with strip 11 and slightly overlapping part of the oxidized layer 14. By controlling the various dimensions of the structure, such as, for example, the width of the strips, the size of tip 13, the thickness of the oxidized layer 14 in accordance with the teachings of the above patent, a diode junction can be fabricated having non-linear properties due to electron tunneling effects.

In the customary operation of diode 10, a first source of optical radiation, usually the input signal, is focused on strip 11 at a site near the junction, and the antenna leg portion thereof couples the radiation field to the diode. A second source of optical radiation, not shown in this FIG., and derived from an optical local oscillator, is also focused at a site on conducting strip 11 adjacent to the diode. The third signal involved in the heterodyning process is a microwave signal, such as that provided by microwave source 16, which is directly coupled to the diode. With the above three signals present, the current flow through the junction contains harmonics of the input radiation and sum and difference frequencies of the three interacting signals. Those frequencies developed, that are in the optical portion of the spectrum, are emitted from the junction as radiation and can be detected or collected by appropriate optical apparatus. Those frequencies which do not have optical wavelengths that flow through the diode can be separated from the microwave signal by appropriate filtering apparatus. A DC bias 17 may also be applied to the diode junction, as mentioned in the above patent, to control the amplitude of the various frequencies present in the system as a consequence of the heterodyning process.

In accordance with the present invention, when the detector shown in FIG. 1 is used in a receiver that forms part of an optical communication system, for example, the optical signal radiated by the transmitter is a composite signal containing two optical signal components. This mode of operation can be achieved by resorting to two frequency locked lasers with independent or partially shared cavities or to a dual mode laser 18 in the transmitting apparatus. The latter type of laser provides an output which contains two related optical signal components, both of a coherent nature and having a co-linear spatial relationship. In FIG. 1, laser 18 which produces such a composite signal is coupled to a suitable transmitter 19 which is adapted to direct the laser beam over a propagation path to the input circuit of the receiving apparatus. Input circuit 20, as is well known, may take the form of any suitable optical arrangement including a lens 21 which captures the incoming composite signal and focuses it at a proper site within the optical detector.

If the transmitted signal in the arrangement of FIG. 1 has optical componets $E_1 \cos \omega_1 t$ and $E_2 \cos \omega_2 t$ and the microwave source 16 provides a signal $E_{mw} \cos \omega_{mw} t$ then, as indicated hereinbefore, the output of the detector will generally contain a component which corresponds to $$V_o = K E_1 E_2 E_{mw} \cos [(\omega_{mw} - \omega_2 + \omega_1)t] \qquad (2)$$

The magnitude of the microwave signal $E_{mw}$ is here made sufficiently large to provide conversion gain. Also, the specific frequency of this signal is selected such that even if $\Delta\omega_{opt}$, the difference between the two optical components lies in the microwave region, $\omega_o$, the output frequency, occurs in the low radio frequency region. This frequency selection also simplifies the filtering operation needed to isolate the output signal from the microwave signal which is also flowing through the diode junction.

The choice of the microwave signal frequency also establishes the field-of-view of the receiver since this parameter in the three-wave detector is determined by the wavelength of this signal rather than that of the optical signal. This feature can result in a two-to-three order magnitude increase in the field-of-view of the apparatus.

FIG. 2 is a schematic diagram of a high resolution optical phase ranging system utilizing the three-wave heterodyning detection process where again the necessity of having an optical local oscillator in the apparatus is avoided by utilizing a composite signal having two optical signal components. This composite signal is here generated by dual frequency laser 30, and the output beam from this laser is directed through beam splitters 31 and 32 which are located along the optical axis of the laser to the remote target which, for the purposes of this description, is at a distance "D" from the transmitter. A portion of the laser output beam is diverted by beam splitter 31 to an optical detector 33, of the type hereinbefore described, which has the cubic response. The third signal to this reference detector is obtained from microwave oscillator 35 which is directly coupled thereto.

The return signal from the target is deflected by beam splitter 32 and directed to a second optical detector 34 which is similar in construction and operation to detector 33. This target detector is also supplied with a microwave signal from microwave oscillator 35. In the above arrangement, the output of detector 33 serves as a reference signal, and its phase relationship with respect to the output signal from target detector 34 is analyzed to provide an indication of the range to the remote reflecting target.

The output from detector 33 is fed to a first mixer 37 which has as its other input a signal derived from a radio frequency oscillator 36. The signal from this mixer serves as one input to a second mixer 38 which has the output of target detector 34 coupled thereto. The mixing operations, it will be appreciated are resorted to in order to convert the frequency of the final output signal to the RF range where the further processing of this signal in appropriate phase analysis circuitry 39 can be carried out with inexpensive circuits and components.

The frequency stability requirement for the overall ranging system of FIG. 2 is not severe since only the phase variations during the optical transit time to and from the target are significant. However, if desired, the output from the reference detector 33 can be used to lock the intermode frequency of laser 30 to a fixed value. To accomplish this, the output from mixer 37 is fed to a laser frequency control circuit 40 which has a stable radio frequency oscillator 41 also coupled thereto whose signal corresponds to $\cos(\omega_{mw} - \omega_2 + \omega_1)t$. Control circuit 40 senses any change between the frequencies of the two applied signals and adjusts, for example, the cavity dimension of dual frequency laser 30 to minimize or eliminate any drift.

If the output from the dual frequency laser 30 is $E_1 \cos(\omega_1 t + \phi_1) + E_2 \cos(\omega_2 t + \phi_2)$ the return reflected signal will be in the form of $$E_1 \cos(\omega_1 t + \phi_1 + \frac{4\pi D}{\lambda_1}) + E_2 \cos(\omega_2 t + \phi_2 + \frac{4\pi D}{\lambda_2}).$$

With these signals serving as the inputs to the reference and target detectors 33 and 34, respectively, and with the microwave oscillator 35 generating a signal $E_{mw}\cos\omega_{mw}t$, the output of detector 33 will be $E_1 E_2 E_{mw} \cos[(\omega_{mw} + \omega_2 - \omega_1)t + (\phi_2 - \phi_1)]$ and the output from target detector 34 will be $$E_1 E_2 E_{mw} \cos[(\omega_{mw} + \omega_2 - \omega_1)t + (\phi_2 - \phi_1) + 4\pi D(\frac{1}{\lambda_2} - \frac{1}{\lambda_1})].$$

If radio frequency oscillator 36 provides the signal $\cos\omega_r t$ to mixer 37, the output from mixer 38 will be $$A \cos(\omega_r t + \frac{4\pi D}{\lambda_{21}}) \text{ where } \frac{1}{\lambda_{21}} = \frac{1}{\lambda_2} - \frac{1}{\lambda_1}.$$

It will thus be seen that the arbitrary fixed phases assigned to the optical signal components and any slow phase variations in the optical and microwave signals cancel out and do not appear in the final output signal.

If the distance to the target, D, is expressed in the form $$D = d + n \frac{\lambda_{21}}{2} \tag{3}$$

where
$d \leq \lambda 21/2$ and $n$ = integer
then the phase term $4\pi D/\lambda_{21} \equiv \phi_{21}$ appearing in the signal at the output of mixer 38 is given by $\phi = (4\pi d/\lambda_{21}) + 2\pi n$, and since $$\cos(\omega_r t + \frac{4\pi d}{\lambda_{21}} + 2\pi n) = \cos(\omega_r t + \frac{4\pi d}{\lambda_{21}}),$$

the value of $d$ is obtained by direct measurement of the phase.

Once $d$ is accurately known, then a rough measurement of D, with accuracy $\lambda 21/4$, will suffice to determine $n$ of equation (3), thus allowing an accurate calculation of D. To perform this measurement, a small change $\Delta\nu_{21}$, is made in the intermode frequency and the resulting change, $\Delta\phi_{21}$, in the measured phase is noted. A preliminary value of D is then calculated using the expression $$D = \frac{c}{4\pi} \frac{\Delta\phi_{21}}{\Delta\nu_{21}} \tag{4}$$

The maximum uncertainty in this rough measurement of D is given by $$E_c(D) = \frac{c}{4\pi} \frac{E(\Delta\phi_{21})}{\Delta\nu_{21}} + \frac{D E(\Delta\nu_{21})}{\Delta\nu_{21}} \tag{5}$$

Where $E(\Delta\phi_{21})$ is the uncertainty in the measurement of $\Delta\phi_{21}$ and $E(\Delta\nu_{21})$ is the uncertainty in the measurement of $\Delta\nu_{21}$. It should be noted that $E_c(D)$ must be $\leq \lambda 21/4$ in order to unambiguously determine $n$. After $n$ and $d$ have been determined as indicated above, equation (3) is used to calculate an accurate value of range D. The uncertainty $E_f(D)$ in this final determination is obtained by differentiating equation (4) and is given by $$E_f(D) = E(d) + n E(\lambda_{21})$$

or $$E_f(d) = \frac{c}{4\pi} \frac{E(\phi_{21})}{\nu_{21}} + \frac{C E(\nu_{21})}{\nu_{21}^2} + \frac{D E(\nu_{21})}{\nu_{21}} \tag{6}$$

where
$E(d)$ = uncertainty in the determination of $d$
$E(\phi_{21})$ = uncertainty in the value of $\phi_{21}$
$E(\nu_{21})$ = uncertainty in the value of $\nu_{21}$
Inserting the reasonable value $E(\Delta,\phi_{21}) = E(\phi_{21}) = 10^{-3}$ radians $\nu_{21} = 30$ GHz $\Delta\nu_{21} = 30$ MHz $E(\nu_{21}) = E(\Delta\nu_{21}) = 1$ KHz Into equations (5) and (6), it is found that for D $\leq$ 75 m, $E_c(D) \leq \lambda 21/4$ and $E_f(D) \leq 3 \times 10^{-4}$ cm.

A range accuracy of approximately $3\mu$m is, therefore, possible at a target range of 75 meters, a precision which is an improvement over prior art systems that range directly off a diffusively deflected target.

It would be pointed out that in the method for determining the target range hereinbefore described, two phase measurements were made at two distinct values of $\nu_{21}$. This was done for purposes of simplifying the explanation of the operating principle of the optical phase ranging system shown. However, in actual practice, a continuous variation in $\nu_{21}$ would be employed in conjunction with a continuous phase shift analysis of the ouput signal produced from the final mixer 38.

What is claimed is:
1. In an optical ranging system for determining the distance to a remote reflecting target, the combination of
means for generating at a first site a composite signal having two optical signal components $\omega_1$ and $\omega_2$;

means for directing said composite signal toward said remote target and for receiving the signal reflected therefrom;

a first and second optical signal detector which operate on the heterodyne principle;

means for directing said composite signal onto said first detector and said received reflected signal onto said second detector;

a first and second mixer;

means for coupling the output of said first detector to one input of said first mixer and the output of said second detector to one input of said second mixer;

a radio frequency oscillator;

means for generating a microwave signal, $\omega_{mw}$;

means for coupling said microwave signal to both said first and second detectors, the two optical signal components of said composite signal and said received reflected signal interacting with said microwave signal to produce first and second difference signals of frequency $\omega_{mw} - \omega_2 + \omega_1$; and means for coupling said radio frequency oscillator to the other input of said first mixer;

means for coupling the output of said first mixer to the other input of said second mixer whereby the output of said second mixer is a signal whose frequency corresponds to that of said radio frequency oscillator and whose phase is independent of any slow phase variations in said composite signal or said microwave signal; and means for determining the phase relationship between said difference signals whereby to obtain a parameter which is related to the distance from said site to said remote target.

2. In an arrangement as defined in claim 1 wherein each optical signal detector includes
 a first conductor terminating at one end in a point;
 a thin dielectric layer covering said point; and
 a second conductor having an end portion thereof contacting said dielectric layer;
 the dimensions of said conductors and said layer being such that electron tunneling can occur between said conductors in response to a microwave signal coupled to said conductors or to an optical signal focused on said first conductor at a location adjacent said point.

3. In an arrangement as defined in claim 1 wherein said means for generating said composite signal comprises a laser having a dual mode of operation
 said laser being mode-locked so that the optical signal components $\omega_1$ and $\omega_2$ have a fixed frequency separation.

4. In an arrangement as defined in claim 3
 means for controlling said laser thereby to vary the frequency of $\omega_1$ and $\omega_2$ but not the frequency separation therebetween.

5. In an arrangement as defined in claim 4
 means responsive to the output signal from said first mixer for controlling the frequency of said laser so as to prevent any drift in the frequency of the signal components $\omega_1$ and $\omega_2$.

* * * * *